July 15, 1958          J. W. GRAY          2,843,318

EARTH ELLIPTICITY CORRECTOR FOR DEAD RECKONING COMPUTER

Filed March 15, 1955          4 Sheets-Sheet 1

- $a$ = SEMI-MAJOR AXIS OF EARTH
- $b$ = SEMI-MINOR AXIS
- $R_p$ = RADIUS OF CURVATURE OF EARTH AT POLES = $\dfrac{a^2}{b}$
- $R_e$ = RADIUS OF CURVATURE OF EARTH IN THE VERTICAL PLANE AT THE EQUATOR = $\dfrac{b^2}{a}$
- $\rho$ = RADIUS OF CURVATURE AT POINT P
- $C_p$ = CENTER OF CURVATURE AT POINT P

*Fig. 5*

INVENTOR.
JOHN W. GRAY

BY *A. I. Mackey*

ATTORNEY

July 15, 1958  J. W. GRAY  2,843,318
EARTH ELLIPTICITY CORRECTOR FOR DEAD RECKONING COMPUTER
Filed March 15, 1955  4 Sheets-Sheet 3

INVENTOR.
JOHN W. GRAY
BY
ATTORNEY

July 15, 1958  J. W. GRAY  2,843,318
EARTH ELLIPTICITY CORRECTOR FOR DEAD RECKONING COMPUTER
Filed March 15, 1955  4 Sheets-Sheet 4

INVENTOR.
JOHN W. GRAY
BY
ATTORNEY

United States Patent Office 2,843,318
Patented July 15, 1958

2,843,318

EARTH ELLIPTICITY CORRECTOR FOR DEAD RECKONING COMPUTER

John W. Gray, Pleasantville, N. Y., assignor to General Precision Laboratory Incorporated, a corporation of New York Application March 15, 1955, Serial No. 494,505

17 Claims. (Cl. 235—61)

This invention relates to an earth ellipticity corrector for dead-reckoning navigational computers.

Generally speaking, for navigation over the earth's surface, the earth may be considered to be a true sphere. This is satisfactory for most navigation because there are usually check points available through terrestrial or celestial observation by visual or electronic means.

However, for long-range navigation, where dead-reckoning must be relied upon without the assistance of any check points, the assumption that the earth's surface is spherical causes an appreciable error in the computed rates and distance of travel.

The earth's rotation causes its shape to be more like an ellipsoid of revolution than like a sphere, the polar axis being the axis of symmetry. The equatorial diameter is approximately 0.3338% more than the polar diameter. This leads to appreciable error if latitude and longitude are determined by dead-reckoning in which the integration of the component rates of travel in terms of angular velocity from a known starting point are based on an assumed spherical earth. As an example, the computed rate of the change of latitude near the equator will be about ½% less than the actual rate.

Since the points on the earth are located on the maps of the world in terms of a system of orthogonal coordinates, commonly referred to as geographical latitude and longitude, based on the line joining the North and South Poles of the earth as a reference axis, it is highly desirable that dead-reckoning navigation systems provide analogue quantities representing positions and rates of travel in terms of such a coordinate system. Since it is more feasible to determine linear velocities on the earth's surface, it is desirable to have means for converting these velocities into rates of travel and positions in terms of angular velocity about some theoretical reference point. In this connection, the nautical mile is the conventional term of linear measurement, and this was originally defined as one minute of arc on a great circle of a sphere, the radius of which is such that its surface area equals that of the earth at sea level. The accepted value is 1852 meters, or approximately 6076.1 feet.

The shape of the earth is termed geoidal and for most purposes can be considered to be a close approximation of an ellipsoid of revolution. For purposes of this invention the shape of the earth is so considered. The present invention provides means for computing from analogue quantities representing linear rates of travel on the earth's surface, an assumed ellipsoid of revolution, analogue quantities representing angular rates in terms of geographical latitude and longitude. Geographical latitude of a point is defined as the angular distance between the equatorial plane and a line perpendicular to the standard spheroid, that is, the earth's surface, at the given point. It is determined by the angle between the plumb line and the equatorial plane. The longitude is measured in a direction at right angles to the plumb line in a plane parallel to the equatorial plane.

Since the geoidal radius of curvature of the earth's surface at different points on the latter is greater in the vicinity of the poles than it is at the equator, the linear distance per minute of arc of the great circle at the poles is greater than it is at the equator. The number of nautical miles per minute of arc on the earth's surface varies from 0.9951 at the equator in the north-south direction, to 1.0052 nautical miles at the poles. At positions between the equator and the poles the number of nautical miles per unit of arc varies approximately sinusoidally between these values.

Hereinafter, where the term "spherical earth" is used, it refers to a spherical surface on which one minute of great circle arc equals one nautical mile.

Figure 1:
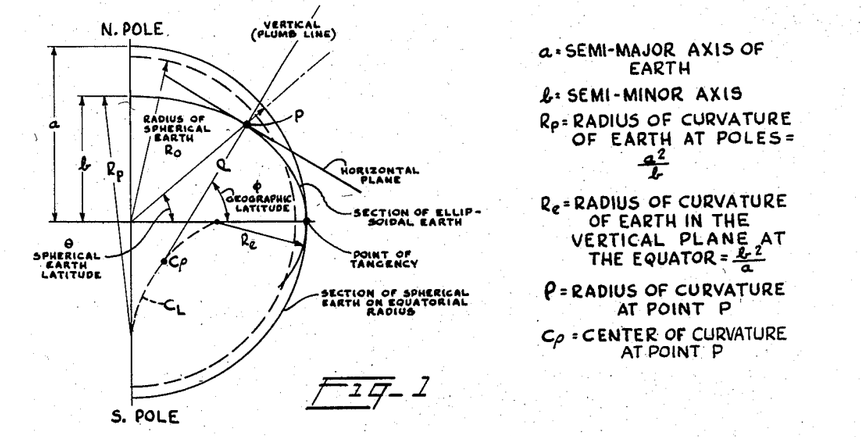
Figure 1 illustrates the geometrical relation between the geoidal and spherical earth.
Figure 2:
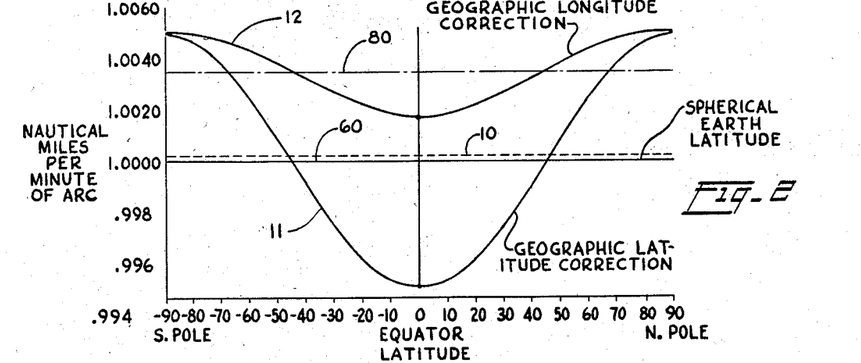
Figure 2 is a graph showing the ratio between the nautical miles and minutes of arc in the north-south and the east-west directions, respectively, on the geoidal earth as functions of latitude.

The relation between the linear distance per degree of arc on the spherical earth and the geoidal earth is illustrated graphically in Fig. 2 while the corresponding geometrical relation is shown in Fig. 1. The deviation of the curvature of the true earth's surface from that of the spherical earth is defined as the ellipticity of the earth.

It is relatively simple to design computer components for resolving spherical trigonometric functions. Since the deviations of the geographical latitude and longitude on the geoidal earth from the spherical earth latitude and longitude are functions of latitude, the present invention provides a novel arrangement for modifying the operation of computers which compute in terms of trigonometric functions in order to supply output analogue quantities accurately representing geographic latitude and longitude.

Accordingly, the primary object of the invention is to provide a novel and improved dead-reckoning computer which continuously supplies output analogue quantities representing true instantaneous geographical latitude and longitude.

A further object is to provide an improved dead-reckoning computer for computing from analogue quantities representing linear speed and direction on the earth's surface analogue quantities representing instantaneous angular velocity and position in terms of geographical latitude and longitude.

A further object is to provide a dead-reckoning navigational computer for continuously correcting instantaneous analogue values representing the integrated north-south speed and integrated east-west speed to compensate for the ellipticity of the earth's surface.

A still further object is to provide an improved dead-reckoning navigational computer which is adapted to be operationally associated with radio-echo speed and distance measuring navigational components for continuously converting analogue quantities representing instantaneous linear speed along the ground track into orthogonal vectorial components of north-south and east-west linear speed and thence to analogue quantities representing instantaneous angular velocity and position on the earth's surface.

Other and further objects will become apparent from the following description when considered in connection with the accompanying drawings in which:

Figures 7 and 8 illustrate the relation between typical meridians in the two coordinate systems, Fig. 7 being a plan view of the earth looking from above onto the North Pole while Fig. 8 is an elevational view of the earth looking toward the transverse South Pole.

In accordance with the broad concept of the present invention, analogue quantities representing linear speed of a craft along a ground track on the earth's surface are resolved into orthogonal vectorial components representing north-south and east-west linear velocity. Due to the curvature of the earth's surface, it is necessary to convert the linear velocities to angular velocities and dead-reckoning positions by integration of the instantaneous velocities.

The relation between the linear velocity over a curved surface and the angular velocity is $$\frac{ds}{dt} = r\frac{d\theta}{dt} \quad (1)$$

where $(s)$ is the linear length of the arc subtended by an angle $(\theta)$ and $(r)$ is the radius of curvature. Accordingly, the instrumentation of a dead-reckoning computer may include components which effect a one-to-one conversion between linear and angular units of velocity by computing in terms of a spherical surface (constant radius) and then correcting for the effect of a variable radius or, on the other hand, computing directly on the basis of a variation in the radius. As will be seen from the following description, the preferred embodiment of the present invention comprises a computing component which integrates on the basis of a spherical surface with the necessary corrections being added to compensate for the deviation of the earth's surface from that of a sphere. The mathematical formula for the geoidal earth is very complicated and therefore the instrumentation of a computer for computing directly in terms of this aspherical surface would likewise be complicated. Since the shape of the earth is a very close approximation to an ellipsoid of revolution, this is taken as the actual shape of the earth for purposes of designing the computing components. The relation between the ratio of nautical miles per unit of arc on a spherical surface and the same ratio for an ellipsoid of revolution is a very close approximation to a sinusoid and is readily determinable.

Figures 7, 8:
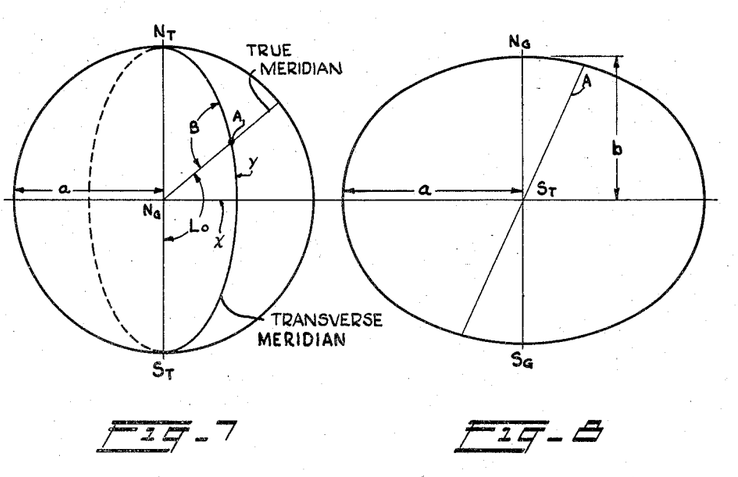

Figures 1, 7 and 8 show schematically in an exaggerated illustration how the shape of the surface of the earth deviates from that of a sphere and how this deviation affects the dead-reckoning computation. It will be apparent that the radius of curvature of the earth in the north-south direction varies from the equator to the poles with two complete cycles of variation occurring per circumnavigation of the earth on a great circle passing through the North and South Poles. Since, by definition, geographical latitude is the angle which the normal to the surface of the ellipsoid makes with the plane of the equator, it will be clear that the geographic latitude linear distance per unit of arc varies with respect to the spherical earth latitude, in a manner dependent upon the variation in radius of curvature. In such an assumed ellipsoid the major axis is in the equatorial plane and the semi-major axis has a value indicated as $(a)$ in Figure 1. However, the semi-major axis $(a)$ is not the same as the radius of curvature of surface in the vicinity of the equator which is indicated as the smaller value $(R_e)$. It will be noted that in going from the equator toward either pole the radius of curvature of the earth's surface progressively changes from the minimum represented by the radius $R_e$ at the equator to the maximum value at the pole indicated by the value $R_e$ and then decreases in a like maner toward the equatorial zone. Between the equator and the North Pole the radius of curvature passes through intermediate values such as that represented by $\rho$, for the point P on the earth's surface. The locus of the centers of curvature is indicated by the dotted line $C_L$ in Fig. 1. Curve 11 in Fig. 2 graphically illustrates how the nautical miles per minute of arc varies from the constant unit value for spherical earth as represented by line 60. Similarly, curve 12 shows the variation in linear distance per unit of arc for longitude.

In accordance with the present invention analogue quantities representing linear velocity along the ground track on the earth's surface are resolved into orthogonal vectorial components representing north-south and east-west linear velocities, with the preferred form including components for translating these linear velocity vectors into angular velocities, and integrating these velocity vectors to give instantaneous position in terms of geographical latitude and longitude. More specifically, the preferred form utilizes resolvers and integrators which normally solve in terms of the spherical earth, with the necessary corrections being added continuously to convert to analogue quantities representing instantaneous geographical latitude and longitude. Accordingly, the basic dead-reckoning computer computes in terms of the spherical earth indicated by the dashed line in Figure 2, having a radius $R_0$ which is of such value that the spherical surface is equal to the surface of the geoidal earth.

The invention is illustrated in connection with an analogue computer for converting input analogue data representing linear speed relative to the earth's surface into angular displacement along orthogonal axes on a spherical surface. In the preferred embodiment shown in Figure 3, electrical means are illustrated for causing the basic output analogue data to deviate from the values for the spherical earth data to compensate for the ellipticity of the earth's surface.

Figure 3:
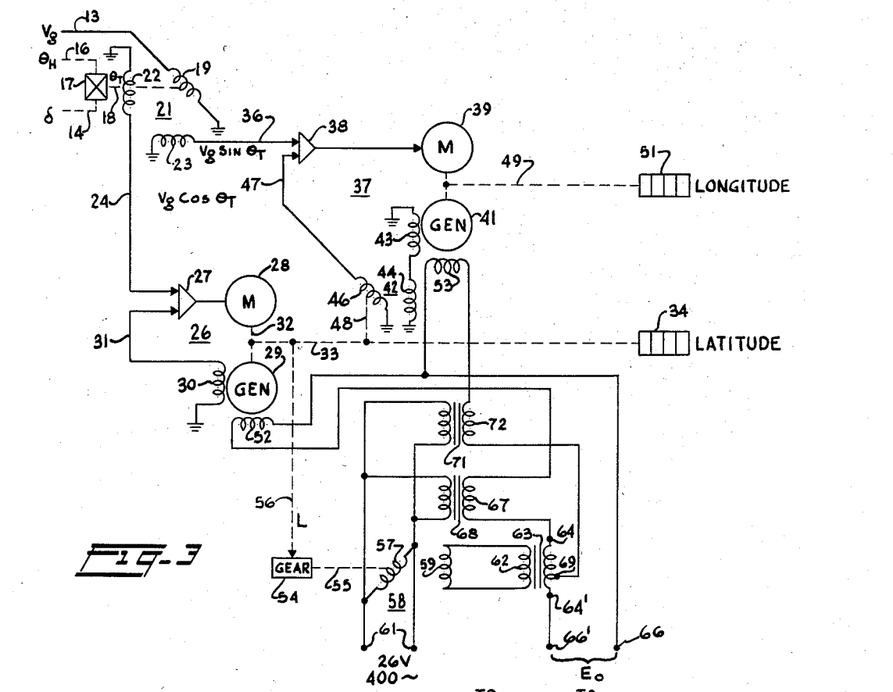
Figure 3 schematically illustrates the electrical and mechanical instrumentation of a computer for providing analogue quantities representing the true geographical latitude and longitude in accordance with the present invention.

In the navigational computer illustrated an analogue quantity such as an electrical voltage $V_g$ representing the linear ground speed of an aircraft is supplied through the conductor 13 to rotor winding 19 of a synchro resolver 21. It is immaterial as far as this invention is concerned how the analogue quantity $V_g$ is obtained. It may be obtained by manipulation of devices in accordance with ground contact or celestial observation or, alternatively, may be determined by radio-echo velocity-measuring devices.

Drift angle $\delta$, if present, may be represented by an analogue quantity in the form of an angular deflection of a shaft 14 and this may be added to an analogue quantity in the form of an angular deflection $\theta_H$ of a shaft 16, representing the heading of the vehicle, in a differential 17 to provide the ground track azimuth angle $\theta_T$ at the shaft 18 to which the rotor winding 19 is fixed.

The resolver 21 is provided with two quadrature-spaced stator windings 22 and 23. The positioning of the rotor winding 19 in accordance with the ground track angle $\theta_T$ causes voltage $V_g$ across the rotor winding 19 to be resolved into two vectorial analogue voltages, one an induced voltage in the winding 22 representing $V_g \cos \theta_T$ which is the linear rate of travel in the N-S direction, and a second voltage $V_g \sin \theta_T$ in the winding 23 representing the linear rate of travel in the east-west direction. The voltage across the winding 22 is applied through the conductor 24 to a rate servo mechanism 26 including an amplifier 27, a motor 28 and a tachometer generator 29. The voltage across the winding 23 is applied through the conductor 36 to a rate servo-mechanism 37 comprising amplifier 38, motor 39 and tachometer generator 41.

Assuming the outputs of the servos 26 and 37 are proportional, respectively, to the voltages on conductors 24 and 36, analogue quantities would be provided which represent instantaneous positions in terms of an orthogonal coordinate system in a plane surface. To convert these positions to corresponding positions on a spherical surface, it is necessary to divide by the radius of curvature of the spherical surface, and in order to compensate for the convergence of the north-south meridians on the spherical surface, it is necessary to multiply the analogue value representing east-west displacement by the cosine of the latitude.

To this end, the servos 26 and 37 are so connected that their respective outputs as represented by the respective indicators 34 and 51 would be directly in terms of polar coordinates on the spherical earth if the excitation of the stator windings of the respective generators 29 and 41 were constant. Then, in order to compensate for the earth's ellipticity the excitation of these generators is varied so that the outputs of the servos 26 and 37 are in accordance with the functions represented by curves 11 and 12 respectively, of Fig. 2.

The tachometer generators 29 and 41 are similar and are of the conventional induction type, each having two stator windings in space quadrature one of which is an input excitation winding and the other is an output winding. The outputs from the output windings 30 and 44, respectively, of these generators are electrical quantities having the same frequency as that supplied to the excitation windings multiplied by a factor representing the speed at which the generators are rotated. The respective excitation windings 52 and 53 are energized from the same source of alternating voltage from which the ground speed analogue is derived.

The north-south velocity voltage on conductor 24 is compared with the feedback voltage on conductor 31 and the difference constituting an error signal is supplied through the amplifier 27 to the motor 28. The secant of latitude correction is introduced into the longitude integrator 37 in order to compensate for the convergence of the north-south meridians on the spherical surface by attenuation of the output of generator 41 by the cosine of latitude through the resolver 42.

Accordingly, the rotor winding 46 of the resolver 42 is positioned by shaft 33, the angular position of which represents latitude. The voltage from rotor winding 46 is supplied through conductor 47 to servo-amplifier 38 where it is compared with the east-west velocity voltage on conductor 36 to provide an error signal voltage which is supplied to the motor 39. The effect of this is to multiply the output of winding 46 by the cosine of the angular position of the latitude shaft 32, which through the feedback circuit divides the voltage on conductor 36 by cos L. The angular position of output shaft 49 of the integrating motor 39 represents an analogue quantity of instantaneous longitude indicated on the longitude counter 51. Under the assumed condition of constant excitation of the generators 29 and 41, this analogue quantity would be proportional to spherical earth longitude. Similarly, the analogue quantity represented by the displacement of output shaft 32 of motor 28 is proportional to spherical earth latitude and is so indicated on counter 34.

From the definition of a nautical mile given above, it will be seen that there is a constant relation between the nautical miles per minute of great circle arc and the spherical earth latitude. This relation is represented in Fig. 2 by the solid straight horizontal line 60 at unit value for nautical miles per minute of arc. Since the curvature of the earth actually varies from point to point it is necessary to add corrections to a dead reckoning computer which computes in terms of spherical earth latitude and longitude in order to provide geographical latitude and longitude and thus correct for earth ellipticity. Any of the different methods for modifying the outputs of integrating servos may be utilized for effecting the ellipticity corrections. For instance, this correction could be introduced into the servo loops by multiplying the output voltages of the respective tachometer generators 29 and 41 by miles per minute of arc, or alternatively, by multiplying the input control voltages to the respective servos 26 and 37 by the ratio of minutes of arc per mile. However, as a practical matter the preferred form of the invention is that shown in Figure 3, wherein this correction is effected by modifying the operation of the integrator motors 28 and 39, respectively, by suitably controlling the excitation of the respective feedback generators 29 and 41. The excitation of the exciting winding 52 of the generator 29 is varied in accordance with the function of latitude represented by curve 11, while the excitation of the exciting winding 53 of the generator 41 is varied in accordance with the function of latitude represented by curve 12. This in turn causes proportionate feedbacks in the servo loops so that the instantaneous speeds of the motors 28 and 39, are proportional respectively, to the latitude and longitude rates on the geoidal earth.

From Fig. 2 it can be seen that the curves 11 and 12 are substantially sinusoids with their zero axes 10 and 80, respectively, displaced from the unit valve axis 60. Since the unit value axis 60 represents the integrated output values of the spherical earth computer when its tachometer generators are excited by a constant voltage, the excitations for geographical latitude and longitude are provided by adding algebraically to the constant excitation voltages correction voltages which vary in accordance with the curves 11 and 12 so that the outputs of the respective generators in the latitude and longitude integrators will be proportional, respectively, to the nautical miles per minute of arc of instantaneous geographical latitude and longitude.

The source of constant excitation voltage between the terminals 66 and 66' is represented by the symbol E and represents unity excitation for the spherical earth computer corresponding to constant unity value output of the latitude integrator 26. The values of the supplementing excitation voltages to be added algebraically to the main source excitation voltage E for the respective integrators can be readily computed directly from curves 11 and 12 of Fig. 2 because the ordinates of the curves are decimal values representing deviations of geographical latitude and longitude rates from the spherical earth rate as the zero reference axis.

Although the earth's diameter at the poles is less than at the equator, the converse is true as far as the respective radii of curvature are concerned. Therefore, in order to travel one minute of arc in a north-south direction at the equator, less displacement is required than at the poles.

Since the nautical mile is the linear distance which subtends an arc of one minute on a "great circle" of a sphere whose surface area equals that of the earth at sea level, it will be seen that in order to travel one minute of arc in the north-south direction at the equator a movement of less than a nautical mile is required while a movement of more than a nautical mile is required to subtend an arc of one minute at the poles.

As previously mentioned, the ellipsoid of revolution gives the best over-all approximation to the true earth's shape. Since by definition an ellipse is the locus of a point whose distance from two fixed points is a constant sum, it can be readily shown mathematically that the radius of curvature in the north-south direction at the equator is $$\frac{b^2}{a}$$

where $a$ and $b$ are the respective semi-axes at the equator and the poles. Similarly, the radius of curvature at the poles is $$\frac{a^2}{b}$$

Going around the earth in north-south directions the linear distance per unit of arc for radii of curvature at the poles and equator, respectively, vary between two extremes in a nearly sinusoidal manner at two cycles per circumnavigation of the earth on great circles passing through the poles. This variation is a function of latitude as shown by curve 11 of Fig. 2.

Moving east and west along the equator, the radius of curvature is simply $a$. In the neighborhood of either pole, the radius of curvature is $$\frac{a^2}{b}$$

and is the same in all directions so that travel east-west per minute of arc is the same as the north-south travel per minute of arc. The longitude rate therefore varies nearly sinusoidally between these two extremes as a function of latitude as shown by curve 12 of Fig. 2.

The range of variation of the north-south rate is about three times that of the east-west rate. Actually, this is the ratio of $$\left(\frac{a^2}{b} - \frac{b^2}{a}\right) \text{ to } \left(\frac{a^2}{b} - a\right)$$

which is equal to 2.99. The significance of this ratio will be more apparent from subsequent description. The north-south rate function is a sinusoid within 0.21% of its own amplitude, and east-west rate function is a sinusoid within 0.13% of its own amplitude.

As seen above, the latitude and longitude integrators 29 and 37 are designed and arranged to compute in terms of a constant radius, that is, a spherical earth, when their feedback generators 29 and 41, respectively, are supplied with constant unity excitation which gives unit miles per minute of arc represented by the solid horizontal 60 in Fig. 2. Then using the two extreme values of the latitude and longitude rates referred to above and the assumption of their sinusoidal variation characteristics, empirical formulas may be derived for varying the excitation of these feedback generators from their unity values in order to correct for the deviation of latitude and longitude on the geoidal earth from that on the spherical earth.

Referring specifically to curve 11, the geographical latitude correction values vary from a maximum of 1.0052 to a minimum of 0.9951. The average value is 1.00015. Since curve 11 is a sinusoid having the maximum and minimum values given above, its reference axis 10 is displaced above the unit values axis 60 by a value of .00015. Also the maximum excursion from the reference axis is the difference between the maximum and the average value, which difference is 0.00505.

Accordingly, the excitation curve for the exciting winding 52 of the latitude generator 29 to convert the output analogue data of integrating servo-mechanism 26 from spherical earth to geographic latitude may be expressed mathematically as follows:

$$E_{52} = E_0 + E_0 (0.00015 - 0.00505 \cos 2L) \quad (2)$$

where $E_{52}$ is the voltage across the exciting winding 52 and $E_0$ is the constant voltage of the source represented by the terminals 66 and 66'. The total excitation voltage is a function of (cos 2L) because there are two cycles of variation of the latitude per circumnavigation of the earth along a great circle through the poles. The manner in which the two cycle variation is supplied is described hereinafter.

By analogous reasoning the excitation curve for the longitude integrator may be determined. The maximum value of the longitude correction curve is 1.0052 and the minimum is 1.0018, with an average of 1.0035. The zero reference axis 80 is above the unit value axis 60 and therefore is considered positive. As previously mentioned, the range of variation of the north-south rate is approximately one-third of the range of the east-west rate variation. Accordingly the variation in the excitation of the exciting winding 53 of the longitude feedback generator 41 may be expressed as $$E_{53} = E_0 + E_0 (0.0035 - 0.0017 \cos 2L) \quad (3)$$

The cosine of latitude function of the correction voltage to be applied to the excitation winding 52 of the generator 29 is provided by a resolver 58, the rotor winding 57 of which is fixed to the output shaft 33 of the latitude integrator motor 28 through the mechanical connection 56.

In order to provide two cycles of variation for the excitation voltage per circumnavigation of the earth, in other words, in order to introduce the function of cosine of twice the latitude, a 1:2 ratio speed multiplier gearing 54 is interposed in the mechanical connection 56 between shaft 33 and the shaft 55 bearing the rotor winding 57 of the resolver 58 so that shaft 55 makes two revolutions for every one of shaft 56. The rotor winding 57 is excited from a suitable alternating voltage source represented by the terminals 61 of the same frequency as the source $E_0$ and of phase coherent therewith. The resolver 58 is so phased that the voltage in its output stator winding 59 represents a cos 2L function of the voltage being supplied to the rotor winding 57. The voltage in winding 59 is impressed on the primary 62 of transformer 63 the secondary of which is in series with the power source $E_0$ which constitutes the main source of excitation voltage for the excitation windings 52 and 53. The ratio of the transformer 63 is such that when the rotor winding 57 is in a position coerresponding to zero latitude an opposing voltage equal to $-0.00505 E_0$ appears across the secondary winding between terminals 64 and 64'. This is a factor of the third term on the right hand side of Equation 2 above. As will be seen from Equation 2, this third term varies as the function of cosine 2L. Voltage representing the second term constant of Equation 2, namely, $+0.00015 E_0$ graphically illustrated by the line 10 in Fig. 2 is provided by transformer 68 the secondary winding 68 of which is connected in series with the main power source $E_0$. The primary of the transformer 67 is energized from the voltage source indicated by the terminals 61.

With reference to the longitude correction it will be seen from Equation 3 that the second term is a positive constant to be added to the unity excitation voltage. An analogue quantity representing this positive constant is supplied by a transformer 71 the primary winding of which is energized from the power source represented by the terminals 61. The secondary 72 is in series in the circuit with the exciting winding 53 of the longitude integrator generator 41. The transformer 71 has a ratio such as to produce an output voltage represented by the second term in Equation 3. The voltage in the secondary winding 72 is so phased as to be additive to the voltage $E_0$ of the main power source.

The subtractive longitude correction voltage for the exciting winding 53, represented by the third term of Equation 3, is supplied from the tap 69 on the secondary of the transformer 63 while the full voltage across the secondary winding of this transformer supplies the appropriate latitude correction for the exciting winding 52 of the latitude generator 29. The ratio of the full voltage across the secondary of transformer 63 to the voltage at tap 69 is approximately three-to-one to accommodate the three-to-one ratio between the range of variation of the latitude and longitude, respectively.

Figure 4:
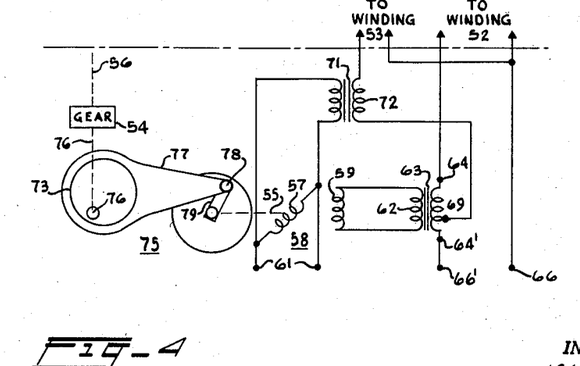
Figure 4 illustrates a modified form of the invention shown in Fig. 3.

Referring again to the latitude correction represented by curve 11, since the second right hand term of Equation 2 is very small a sufficiently accurate approximation correction can be provided through a special oscillating driving connection interposed between the gearing 54 and the shaft 55 which carries the rotor winding 57 of the resolver 58. This alternative arrangement is shown in Figure 4, where a special oscillating drive 75 controls the position of the rotor winding 57 so that for all values of 2L the appropriate correction corresponding to the first right hand term of Equation 2 will be added to the voltage of the output winding 59. This arrangement eliminates the need for the transformer 68 of Figure 3. It will be seen that any error of approximation affecting the voltage $E_{53}$ on the winding 53 will be inconsequential since the correction voltage at the tap 69 on transformer 63 is one-third of that appearing across the terminals 64 and 64'.

The oscillating drive 75 comprises an eccentric 73 fixed to the output shaft 76 from the speed multiplying gearing 54, which causes the rotation of shaft 76 to be a function of 2L. A connecting pitman arm 77 is journalled on the eccentric 73 and is pivotally connected at 78 to a bell crank 79 fixed to the shaft 55 to which the rotor winding 57 of the resolver 58 is fixed. This oscillating drive 75 converts the rotational motion of the eccentric 73 into oscillatory rotation motion of the rotor winding 57 and is so designed that 180° of rotation of the eccentric 73 produces approximately 90° of angular movement of the bell crank 79 and the rotor winding 57. The design of the oscillatory drive 75 and the resolver 58 are such that at an angle, 2L=0, a correction voltage represented by the second term of the right hand side of Equation 2 is provided from the output resolver winding 59.

Figure 5:
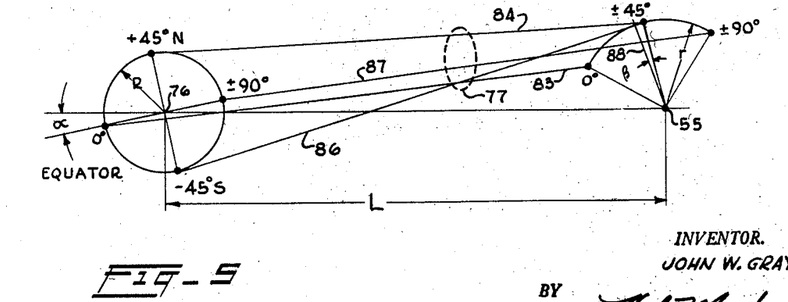
Figure 5 schematically illustrates the operation of one of the components in Figure 4.

The manner in which the design of this crank mechanism may be empirically carried out is indicated in Fig. 5. The radius (R) is equal to the crank arm stroke of eccentric 73, and the radius (r) is the length of the crank arm 79. The center-to-center distance (L) represents the distance between shafts 76 and 55. The lines 83, 84, 86 and 87 represent position of the center line of the connecting rod 77 corresponding to angular deflections of the latitude shaft 56 representing the equator, 45° north latitude, 45° south latitude and the poles, respectively. The line 88 represents the angular position of the crank arm 79 when the output voltage of resolver 58 is zero. When the crank arm 79 is in the center position of its travel it is displaced from the zero voltage output position 88 of the resolver 58 by the angle $\beta$ such as to produce an output from the resolver 58 representing the first term of Equation 2.

A number of physical dimensions and relations of the parts of the oscillating drive 75 may be found empirically which will give output voltage functions closely satisfying Equations 2 and 3. As an example of one design which is reasonably exact in its output, the dimensions are:

Axial distance $L=2.000$ inches,
Length of eccentric crank $R=0.250$ inch,
Lenth of bell crank $(r)=0.355$ inch.
Length of connecting rod $77=1.955$ inches,
Angle $\alpha=10°$,
Angle $\beta=1°$.

The aspects of the invention described so far relate to computations in the conventional geographical coordinate system where the axis passes through the geographical poles. The concept of the invention may be applied to a system in which the latitude and longitude coordinates are based on a reference axis other than that passing through the geographical poles. As long as the relation between the axis of the two coordinate systems is known the rates of travel and positions may be computed according to one coordinate system and then be translated into terms of the other system for accurate continuous world-wide navigation. It is advantageous for the computation system to be capable of computing in terms of at least two coordinate systems because of the convergence of orthogonal coordinates at the poles because of the difficulty of providing integrators capable of operating accurately over the full range of integration as the poles of a single coordinate system are approached.

All points on the earth's surface are conventionally defined in terms of the conventional geographical latitude and longitude coordinate system but because of the convergence of the meridians at the poles, the ratio of geographical longitude to latitude rate becomes so high that the longitude rate is beyond the upper limits of practical integrators which are also capable of covering the range being at the equator. Accordingly, for latitudes higher than about 60° north or south another coordinate system herein called the "transverse coordinate system" may be used for the purpose of computation of velocity and position. These coordinates may be translated into terms of geographical latitude and longitude for navigation purposes, in a manner described in the copending patent application mentioned hereinafter.

The transverse coordinate system is based on great circle meridian lines like the geographical system but the "transverse North Pole" lies upon the geographical equator at 180° longitude and the "transverse South Pole" lies at the intersection of the equator and the Greenwich meridian. The transverse equator therefore corresponds in position with the geographical 90° great circle meridian.

Figure 6:
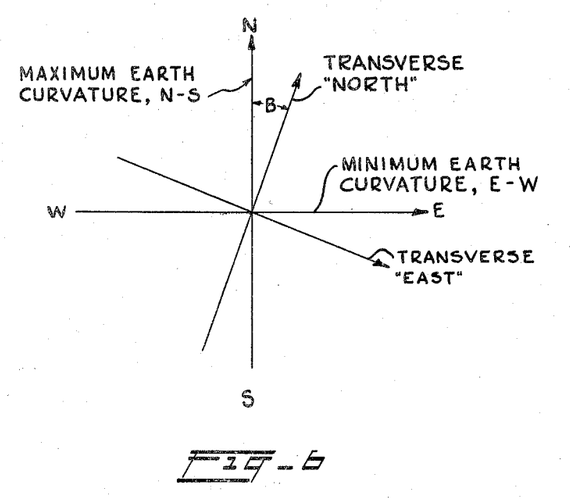
Figure 6 illustrates the cardinal directions in the geographical and transverse coordinate systems, respectively.

The cardinal directions and the relations of the geographical and transverse coordinate systems respectively, are illustrated in Figs. 6, 7 and 8. The angle B represents the angle between the meridians of the two coordinate systems to any arbitrary point A. The symbols y and x are the transverse latitude and longitude, respectively.

A more complete explanation of the transverse coordinate system and means for obtaining an analogue quantity representing angle B may be obtained from copending application Serial No. 410,882, filed February 17, 1954, for World Wide Navigational System, in the names of John W. Gray, Everett B. Hales, and Ivan A. Greenwood, Jr.

It should be apparent from Figs. 7 and 8 that in terms of the transverse coordinate system the rates of travel per unit of arc are functions of longitude as well as latitude whereas in the conventional geographical coordinate system these rates of travel are functions of latitude only. In the transverse system along the Greenwich and date line meridians there is a one-to-one relationship between transverse latitude y and geographical latitude and between transverse longitude x and the geographical longitude, respectively, so that the north-south correction curve 11 in Fig. 2, applies to transverse latitude y and the east-west correction curve 12 of Fig. 2, applies to transverse longitude x. It will also be seen that at the 90th meridian these conditions are interchanged. Therefore, going around the earth at a constant latitude the rates relative to the transverse coordinates will vary through two cycles per circumnavigation between the values given by the two curves for that latitude. As shown in Fig. 7 the two coordinate systems differ by the angle B, which as previously mentioned is a function of latitude and longitude but remains within a limit of about 4° of a one-to-one relationship to geographical longitude at latitudes of 60° and above. The earth's curvature at a given latitude has a maximum extreme north-south and a minimum extreme east-west and the curvature in the y or x direction in the transverse coordinate system will vary between the two as a function of the angle B at two cycles per revolution of B.

Accordingly, above 60° latitude north and south where the longitude rates become too high for accurate integration it is desirable to use transverse coordinates and where the rates of travel per unit of arc are functions of both latitude and longitude, it is necessary to provide latitude and longitude excitation corrections for the generators of the servos different from that described.

In order to distinguish between the two modes of operation, the term "normal" mode will be used herein to designate the computing operation when corrections are made with reference to geographical coordinates and the terms "polar" or "transverse" mode will designate operations when corrections are referred to the transverse coordinates.

Figure 9:
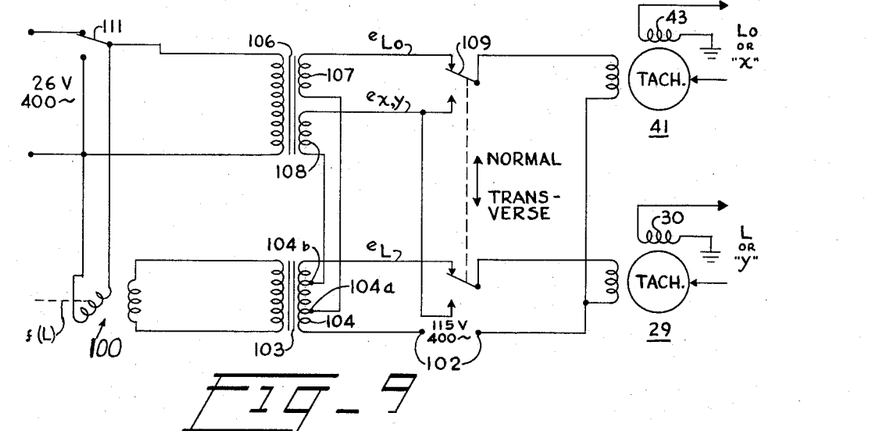
Figure 9 shows a modified form of the embodiment of Fig. 1 wherein provision is made for alternately computing latitude and longitude in the normal or transverse mode.

From Fig. 2 it will be apparent that in the region of the earth above 60° latitude where the transverse coordinates are used the necessary latitude and longitude corrections will vary between latitude and longitude corrections as maximum limits and this variation will never be more than 0.1% from the average value. Accordingly, the average of the geographical latitude and longitude deviations from the spherical earth coordinates, may be used as a basis for both the latitude and longitude excitation corrections for the integrators when they are computing in transverse coordinates. Such an arrangement is shown in Fig. 9 with provision for switching from normal to the transverse or polar mode.

All correction increments, for the geographical latitude, longitude and the transverse $y$ and $x$ coordinates, respectively, are the same function of twice the latitude but with different amplitudes and added constant amounts. Thus it is possible to use the same function generating device, such as the resolver 100 similar to the resolver 58 previously described and operated generally in the manner described in connection with Figure 4. The rotor of this resolver is supplied preferably from a twenty-six volt source of the same phase and frequency as the main excitation supply source represented by the terminals 102. The general arrangement in this embodiment is similar to that previously described except that the output of the resolver 100 is supplied to a transformer 103, a secondary winding 104 of which is tapped to provide three outputs for the three amplitudes of the correction increments mentioned above. A second transformer 106, the primary of which is energized by the same twenty-six volt source which energizes the rotor of the resolver 100 is provided with two secondaries 107 and 108 which have a two-to-one ratio for supplying the added constants. The secondary winding 107 supplies the necessary constant correction for the excitation of the longitude integrator feedback generator 41 and the full voltage of the transformer 103 supplies the offset axis correction voltage for latitude integrator feedback generator 29 during the normal mode of operation. The secondary winding 108 supplies the constant correction excitation voltage which is half-way between the latitude and longitude corrections for both the feedback generators 29 and 41 during the operation in the transverses mode. A suitable double-pole double-throw switch 109 is provided for converting the operation from normal to transverse.

In this embodiment, for operation in the normal mode the total excitation voltage for the feedback generator 29 in the latitude integrator is designated by $e_L$ while that for the feedback generator 41 in the longitude integrator is designated by $e_{L0}$. The total excitation voltage for both when operating in the polar or transverse mode is designated by $e_{x,y}$.

Since a mechanical linkage similar to that disclosed in Fig. 4 is used to position the rotor winding of resolver 100 to supply voltage corrections so that the output of the resolver 100 approximates the latitude correction curve 11 of Fig. 2, no additional transformer corresponding to transformer 68 in Fig. 3 is needed. The function of cos 2L excitation correction for normal mode of operation is derived from a tap 104a on the secondary winding 104, while tap 104b provides the necessary cos 2L excitation correction function for operation in the transverse mode. In this embodiment it will be understood that the output from the respective tachometer generators 29 and 41 will be utilized as feedback voltages in the servo loops as described in connection with the first embodiment in Fig. 3. For purposes of calibration a suitable single-pole double-throw switch 111 is provided for alternatively placing the rotor winding of the resolver 100 across the twenty-six volt power supply or for shorting the winding.

Figure 10:
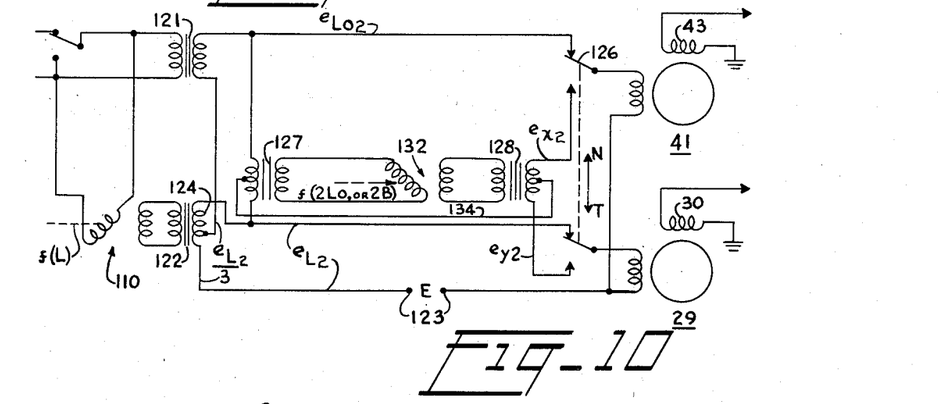
Figure 10 is a further modification of the system shown in Fig. 9.

In the event that it is desired to provide a system having even greater accuracy when navigating in regions of the earth above 60° latitude a further modification may be employed, such as that shown in Fig. 10. The implementation of the embodiment of Fig. 10 comprises transformers 121 and 122, the outputs of which supplement the main excitation voltage source represented by the terminals 123. The transformer 121 supplies the constant correction as before while the secondary 124 of transformer 122 supplies the cos 2L function correction. During the normal mode of operation the full voltage of secondary 124, supplies the correction voltage for the feedback generator 29 in the latitude integrator, while one third of the cos 2L function voltage at the tap on secondary 124 is added algebraically to the constant output voltage of transformer 121 and the main source 123 to supply the total excitation for the feedback generator 41 of the longitude integrator.

In the polar or transverse mode of operation, total excitation voltage $e_{y2}$ is supplied to the generator 29 and excitation voltage $e_{x2}$ is supplied to the generator 41. The transposition is effected by a double-pole double-throw switch 126.

Since the transverse poles lie on the earth's equator where the latitude and longitude rates are different, in the transverse mode for best accuracy, the corrections should be functions of both. To this end, excitation voltages $e_{y2}$ and $e_{x2}$ are derived from a special transformer and resolver arrangement comprising two transformers 127 and 128 both of which have center tapped windings 129 and 131, respectively, and a resolver 132 which is actuated in accordance with twice the angle B for the more precisce operation, or twice the longitude angle if less accuracy can be tolerated where because of packaging of the components it might be less feasible to use angle B data.

Figure 11:
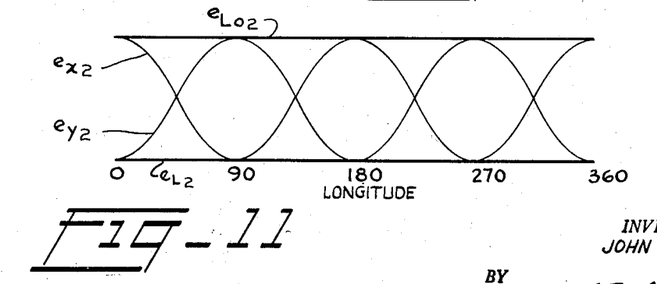
Figure 11 graphically illustrates the variation in correction for latitude and longitude in both the geographical and transverse coordinates as functions of latitude.

The center tapped primary of transformer 127 has impressed across it a voltage representing the difference between the maximum instantaneous total correction voltages $e_{L2}$ and $e_{L02}$. The output of transformer 127 is supplied to the primary of transformer 128 as a function of $2L_0$ or $2B$ through the resolver 132. The connection 134 between the center of the primary of transformer 127 and the center tap of the secondary of transformer 128 constitutes an electrical reference point with respect to which the voltages $e_{y2}$ and $e_{x2}$ at the respective output terminals of transformer 128 vary sinusoidally 180° apart as shown in Fig. 11. In this embodiment the output voltages from the feedback generators 29 and 41, respectively, may be used in the integrator servo loops as in the other embodiments.

What is claimed is:

1. In a dead-reckoning navigation device, means for resolving analogue quantities representing linear speed and direction into orthogonal vectorial coordinate quantities, first and second means for converting the respective vectorial quantities into analogue quantities representing instantaneous orthogonal position coordinates on a curved surface defined in terms of angular displacement about an assumed center of curvature, and means for continuously modifying simultaneously the action of both of said integrating means in accordance with a predetermined function to provide instantaneous orthogonal position coordinates in terms of angular distance on a curved surface whose radius of curvature varies according to a known function.

2. In a dead-reckoning navigation system for continuously providing dead-reckoning navigation data comprising, means for resolving analogue data representing linear speed relative to the earth's surface into instantaneous orthogonal vectorial coordinate quantities, first and second integrating means responsive to the respective coordinate quantities to convert the latter to spherical coordinate quantities, and means simultaneously applying to said integrating means instantaneous data representing instantaneous departure of the earth's surface from that of a sphere to provide output analogue data representing geographical latitude and longitude.

3. In a dead-reckoning navigation computer for continuously computing instantaneous velocity and position of an aircraft relative to the earth in terms of a coordinate system based on the minor axis of the earth from data representing instantaneous linear speed and direction comprising, a resolver for resolving linear speed and direction data into instantaneous orthogonal vectorial components at the instantaneous point on the earth where the velocity is measured, first and second integrating means responsive to data representing the respective vectors to provide instantaneous positional summation vectors orthogonal at the instantaneous point on the earth where the speed is measured, said first and second integrating means being operatively associated so that the output of said second integrating means is modified in accordance with the output of said first integrating means thereby producing an output from said second integrating means which is corrected for convergence of meridians in an orthogonal coordinate system on a spherical surface and means for modifying simultaneously the outputs of said first and second integrating means in accordance with a function of twice the angular distance measured from the equator on a great circle passing through said axis as represented by the output of said first integrator.

4. In a dead-reckoning navigation computer for continuously computing instantaneous velocity and position of an aircraft relative to the earth in terms of an orthogonal coordinate system based on a predetermined axis from data representing instantaneous linear speed and direction comprising, a resolver for resolving linear speed and direction data into analogue data representing velocity vectors in orthogonal directions at the point on the earth where the velocity is measured, first and second integrating means responsive to the respective vectors to provide integrated instantaneous displacement data, said first and second integrating means being operatively associated with each other so that the output of said second integrating means is modified in accordance with the cosine of the angular distance on a great circle passing through the poles of the reference axis and the point on the earth's surface where the speed is measured as represented by the output of said first integrator means whereby the output of said second integrating means is corrected for the convergence of meridians in an orthogonal coordinate system on a spherical surface, and means for varying simultaneously the outputs of said first and second integrating means in accordance with a function of twice the angular distance represented by the output of said first integrating means.

5. In a dead-reckoning navigation computer for continuously computing instantaneous velocity and position of an aircraft relative to the earth in terms of an orthogonal coordinate system based on a predetermined axis from data representing instantaneous linear speed and direction comprising, a resolver for resolving linear speed and direction data into analogue data representing velocity vectors in orthogonal directions at the point on the earth where the speed is measured, first and second integrating means responsive to the respective vector data to provide accumulated instantaneous displacement data in the form of displacements of shafts of the respective integrators, said second integrating means being also responsive to analogue data representing the cosine of the angular distance on a great circle passing through the poles of the reference axis and the instantaneous point on the earth's surface where the speed is measured, said latter analogue data being represented by the angular displacement of the shaft first integrator, so that the relative angular displacements of the shafts of said first and second integrating means may constitute analogue values of orthogonal coordinates of instantaneous position on a spherical surface, and means for varying simultaneously the angular displacements of the output shafts of said integrating means in accordance with a function of twice the angular distance represented by the angular displacement of the output shaft of said first integrator.

6. In a dead-reckoning navigation system, means for continuously resolving linear speed and direction data relative to the earth's surface into instantaneous orthogonal vectorial quantities along the earth's surface, first and second integrating means responsive to the respective quantities to provide accumulated analogue quanties representing instantaneous displacement along orthogonal coordinates on the earth's surface, means interconnecting said first and second integrating means so that the output of said second integrating means is modified in accordance with a function of the cosine of the angular distance, measured from a plane normal to the reference axis of said coordinate system as represented by the output of said first integrating means, on a great circle passing through the axis of the coordinate system, to the instantaneous point on the earth where the speed is measured so as to produce an output from said second integrating means which is corrected for the inherent convergence of meridians in an orthogonal coordinate system on a spherical surface, means for varying simultaneously the output from said first and second integrating means in accordance with the cosine of twice the angular distance on a great circle passing through the axis of said coordinate system as represented by the output of said first integrating means and means for relatively displacing the zero axis of said functional variations.

7. In a dead-reckoning navigation system for continuously computing the instantaneous position of an object, such as an aircraft, in terms of an orthogonal coordinate system based on the polar axis of the earth comprising, a first resolver having a rotor winding adapted to be energized by an analogue voltage representing linear speed of the aircraft with respect to the earth, said first resolver also having two stator windings arranged in space quadrature, said rotor winding adapted to be positioned in accordance with an analogue quantity representing ground track angle measured with respect to a line joining the instantaneous position of said object and a fixed point on the earth's surface to thereby provide in said stator windings respective analogue voltages representing instantaneous orthogonal velocity vectors along the earth's surface, said first resolver being so phased that one of said velocity vectors represents velocity toward or away from said fixed point, a first rate servomechanism energized by the analogue voltage representing the instantaneous speed toward or away from said fixed point, a second rate servomechanism energized by the voltage from the other stator winding of said first resolver, a second resolver controlled in accordance with the output of said first rate servo for modifying the operation of said second servomechanism in accordance with the relation between the latitude and longitude on a spherical surface and means for continuously and simultaneously supplying respective correction voltages to each of said servos in accordance with a function of the output of said first servo so that said servos provide respective analogue outputs representing true geographical latitude and longitude.

8. In a dead-reckoning navigation system for continuously computing the instantaneous position of an object, such as an aircraft, travelling relative to the earth's surface in terms of an orthogonal coordinate system based on the polar axis of the earth comprising, a resolver having a rotor winding adapted to be energized by an analogue voltage representing the linear speed of said object with respect to the earth's surface, said resolver also having two stator windings arranged in space quadrature, said rotor winding adapted to be positioned in accordance with a function of an analogue quantity representing ground track angle measured with respect to a line connecting the instantaneous position of said object and a fixed point on the earth's surface to thereby induce in the respective stator windings analogue voltages representing instantaneous orthogonal velocity vectors along the earth's surface, said resolver being so phased that one of said vectors represents velocity of said object toward or away from said fixed point, a first rate servomechanism energized by the voltage from said first resolver representing velocity toward or away from said fixed point, a second rate servomechanism energized by the voltage from said other stator windings, said servomechanisms each including an amplifier and a feedback generator for supplying feedback voltages to the respective amplifiers, a second resolver controlled in accordance with a function of the output of said first rate servo for modifying the feedback voltage to the amplifier in said second rate servomechanism in accordance with the relation between orthogonal coordinates on a spherical surface and means for continuously and simultaneously supplying energization voltages to the respective feedback generators in accordance with analogue quantities each representing selected functions of double the analogue of latitude output of said first integrator for correcting the outputs of said first and second servos so that they give analogue outputs representing respectively, true geographical latitude and longitude.

9. In a dead-reckoning navigation system for continuously computing the instantaneous position of an object, such as an aircraft, travelling relative to the earth's surface in terms of an orthogonal coordinate system based on the polar axis of the earth comprising, a resolver having a rotor winding adapted to be energized by an analogue voltage representing the linear speed of said object with respect to the earth's surface, said resolver also having two stator windings arranged in space quadrature, said rotor winding adapted to be positioned in accordance with a function of an analogue quantity representing ground track angle measured with respect to a line connecting the instantaneous position of said object and a fixed point on the earth's surface to thereby induce in the respective stator windings analogue voltages representing instantaneous orthogonal velocity vectors along the earth's surface, said resolver being so phased that one of said vectors represents velocity of said object toward or away from said fixed point, a first rate servomechanism energized by the voltage from said first resolver representing velocity toward or away from said fixed point, a second rate servomechanism energized by the voltage from said other stator winding, said servomechanisms each including an amplifier and a feedback generator for supplying feedback voltages to the respective amplifiers, a second resolver controlled in accordance with a function of the output of said first rate servo for modifying the feedback voltage to the amplifier in said second rate servomechanism in accordance with the relation between orthogonal coordinates on a spherical surface and means for continuously and simultaneously supplying energization voltages to the respective feedback generators in accordance with analogue quantities each representing cosine functions of double the analogue of latitude output of said first integrator for correcting the outputs of said first and second servos so that they give analogue outputs representing respectively, true geographical latitude and longitude.

10. In a dead-reckoning navigation system for continuously computing the instantaneous position of an object, such as an aircraft, travelling relative to the earth's surface in terms of an orthogonal coordinate system based on the polar axis of the earth comprising, a resolver having a rotor winding adapted to be energized by an analogue voltage representing the linear speed of said object with respect to the earth's surface, said resolver also having two stator windings arranged in space quadrature, said rotor winding adapted to be positioned in accordance with a function of an analogue quantity representing ground track angle measured with respect to a line connecting the instantaneous position of said object and a fixed point on the earth's surface to thereby induce in the respective stator windings analogue voltages representing instantaneous orthogonal velocity vectors along the earth's surface, said resolver being so phased that one of said vectors represents velocity of said object toward or away from said fixed point, a first rate servomechanism energized by the voltage from said first resolver representing velocity toward or away from said fixed point, a second rate servomechanism energized by the voltage from said other stator winding, said servomechanism each including an amplifier and a feedback generator for supplying feedback voltages to the respective amplifiers, a second resolver controlled in acordance with a function of the output of said first rate servo for modifying the feedback voltage to the amplifier in said second rate servomechanism in accordance with the relation between latitude and longitude on a spherical surface and means for continuously supplying energization to the feedback generator in said first servomechanism in accordance with an analogue quantity representing a product of a constant and the cosine of twice the latitude analogue output of said first integrator and means for simultaneously and continuously supplying energization to the feedback generator in said second servomechanism in accordance with said analogue quantity representing a product of a second constant and the cosine of twice the latitude analogue output of said first integrator, the ratio of said first constant to said second constant being approximately three to one.

11. In a dead-reckoning navigation system for determining speed and displacement in terms of an orthogonal coordinate system based on the polar axis of the earth, first and second servo-integrating means for integrating two respective orthogonal speed vector quantities to two respective corresponding orthogonal analogue quantities representing position in a plane tangent to the instantaneous vector quantities, means for modifying the operation of one of said integrators in accordance with the cosine function of the angular distance from the equatorial plane on a great circle passing through the axis of said coordinate system to compensate for the convergence of meridians as the poles of the axis are approached, to thereby give analogue quantities representing coordinates in an orthogonal coordinate system on a spherical surface of selected radius, and means for supplying corrections to said servo-integrators for converting said analogue quantities into terms of geographic latitude and longitude including means for generating and applying correction voltages having the general form $a+b \cos 2L$ where $a$ and $b$ are constants, to said servo-integrators, to compensate for the departure of the earth's surface from that of a spherical surface.

12. In a navigational dead-reckoning device including first and second means for integrating two orthogonal speed analogue quantities to corresponding first and second orthogonal position analogue shaft position quantities representing latitude and longitude of present position respectively, instrumentation for correcting said shaft position quantities for earth ellipticity comprising, means for multiplying said first shaft position quantity by two to form an output shaft quantity, means for securing the cosine function of said output shaft position quantity as an analogue voltage, means for multiplying said analogue voltage by a first constant to form a first product voltage, means for adding a first constant voltage to said first product voltage to form a first correction voltage, means for adding said first correction voltage in said first means for integrating to produce a corrected said first orthogonal position analogue shaft position quantity, means for dividing said analogue voltage by three to form a second product voltage, means for adding a second constant voltage to said second product voltage to form a second correction voltage, and means for adding said second correction voltage to said second means for integrating to produce a corrected said second orthogonal position analogue shaft position.

13. In a navigational dead-reckoning device including first and second means for integrating two orthogonal speed analogue quantities to derive corresponding first and second shaft position quantities representing orthogonal displacement vectors in a plane tangent to said vectors, said first and second integrating means including first and second generators having first and second voltage excitation windings respectively, instrumentation for correcting said shaft position quantities for earth ellipticity comprising, means for multiplying said first shaft position quantity by two to form an output shaft quantity, a resolver rotated by said output shaft generating a cosine analogue voltage, a first transformer excited by said cosine analogue voltage having such ratio of transformation as to produce an output first product voltage representing said cosine analogue voltage multiplied by a first constant, a first addendum transformer having its secondary winding in series with the secondary winding of said first transformer to add to said first product voltage a first addendum voltage to form a first correction voltage, means for adding said first correction voltage to the input to said first voltage excitation winding to produce a corrected first shaft position quantity representing latitude corrected for earth ellipticity, a one-third tap on the secondary winding of said first transformer to present a second product voltage, a second addendum transformer having its secondary winding in series with said one third tap to form a second correction voltage, and means for adding said second correction voltage to the input to said second voltage excitation winding to produce a corrected second shaft position quantity representing longitude corrected for earth ellipticity.

14. In a navigational dead-reckoning device including first and second means for integrating two orthogonal speed analogue quantities to derive corresponding first and second orthogonal coordinate position analogue quantities, instrumentation for correcting said first and second orthogonal position analogue quantities for earth ellipticity comprising, means for multiplying said first orthogonal position analogue quantity by two to form an output shaft position quantity, an eccentric mounted on said output shaft, a reciprocable rocker arm mounted on a shaft, connecting rod means connected between said eccentric and said reciprocable rocker arm whereby the continuous rotation of the eccentric is converted into reciprocating rotation of the rocker arm and its shaft, means for securing the cosine function of said shaft position quantity, means for multiplying said cosine function by a first constant factor to form a first correction term, means for adding said first correction term to said first orthogonal position analogue quantity to form a first corrected orthogonal position analogue quantity, means for dividing said first correction term by three to form a quotient quantity, means for adding an addendum quantity to said quotient product to form a second correction term, and means for adding said second correction term to said second orthogonal position analogue quantity to form a second corrected orthogonal position analogue quantity.

15. In a navigational dead reckoning device including first and second means for integrating two orthogonal speed analogue quantities to derive corresponding first and second shaft position quantities representing latitude and longitude of present position respectively, said first and second means for integrating containing first and second generators having first and second voltage excitation windings respectively, instrumentation for correcting said shaft position quantities for earth ellipticity comprising, means for multiplying said first shaft position quantity by two to form an output shaft quantity, an eccentric rotated by said output shaft, a rocker arm reciprocated through 90° by said eccentric, said rocker arm having a rocker arm shaft, a resolver rotated by said rocker arm shaft generating a cosine analogue voltage plus an addendum voltage controlled by the relative setting of said resolver on its shaft to form an output voltage, a first transformer excited by said output voltage having such ratio of transformation as to produce a first correction voltage representing said output voltage multiplied by a first constant, means for adding said first correction voltage to the input to said first voltage excitation winding to produce a corrected first shaft position quantity representing latitude corrected for earth ellipticity, a one-third tap on the secondary winding of said first transformer to present a product voltage equal to one-third of said first correction voltage, an addendum transformer having its secondary winding in series with said one-third tap to form a second correction voltage, and means for adding said second correction voltage to the input to said second voltage excitation winding to produce a corrected second shaft position quantity representing longitude corrected for earth ellipticity.

16. In a dead-reckoning navigation device, means for resolving analogue quantities representing linear speed and direction into orthogonal vectorial coordinate quantities, first and second means for converting the respective vectorial quantities into analogue quantities representing instantaneous orthogonal position coordinates on a curved surface defined in terms of angular displacement about an assumed center of curvature, means for continuously modifying simultaneously the action of both of said converting means in accordance with a predetermined function to provide instantaneous orthogonal position coordinates on a body having a geoidal surface where the axis of the coordinate system on the latter surface coincides with the minor axis of the geoidal body, and further means for modifying the operation of said converting means for causing said integrating means to compute positional coordinates in terms of an orthogonal coordinate system based on an axis having a predetermined relation to the axis of said first orthogonal coordinate system, and to the minor axis of said geoidal body.

17. In a dead-reckoning navigation device, means for resolving instantaneous linear vector quantities representing linear speed and direction into orthogonal coordinate quantities, first and second means for integrating said respective orthogonal coordinate quantities to produce a second set of orthogonal coordinate quantities representing displacement on a spherical surface, instrumentation for translating said second set of orthogonal coordinate quantities into terms of orthogonal coordinates on a geoidal body, such as the earth, where under condition (1) the axis of the coordinate system coincides with the minor axis of said geoidal body, or under condition (2) the axis of the coordinate system is rotated 90° from the minor axis of said geoidal body comprising, means for selectively; (a) supplying to said first integrating means a correction voltage which varies in accordance with a cosine function of twice the angular distance from the equatorial plane of said body, means for supplying to said second integrating means a correction voltage which is one-third of said correction voltage supplied to said first integrating means plus a constant voltage; or (b) supplying a correction voltage to both said integrators which is two-thirds of the correction voltage supplied to said first integrating means under (a) above plus the same constant as in (a) above to compute in terms of orthogonal coordinates on said geoidal surface where the coordinate system axis is displaced 90° relative to said minor axis.

References Cited in the file of this patent

UNITED STATES PATENTS

| | | |
|---|---|---|
| 2,406,836 | Holden | Sept. 3, 1946 |
| 2,588,763 | Reilly et al. | Mar. 11, 1952 |